US007928678B2

(12) United States Patent  (10) Patent No.: US 7,928,678 B2
Imai et al.  (45) Date of Patent: Apr. 19, 2011

(54) DOOR OPENING/CLOSING CONTROL DEVICE

(75) Inventors: Takuya Imai, Yamanashi (JP); Tsunenori Senbongi, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 565 days.

(21) Appl. No.: 12/076,935

(22) Filed: Mar. 25, 2008

(65) Prior Publication Data
US 2008/0178422 A1     Jul. 31, 2008

Related U.S. Application Data

(62) Division of application No. 11/317,081, filed on Dec. 27, 2005, now abandoned.

(30) Foreign Application Priority Data

Dec. 28, 2004  (JP) ................................ 2004-379882

(51) Int. Cl.
*H02P 5/00* (2006.01)
*E05F 15/10* (2006.01)
(52) U.S. Cl. ............ 318/468; 318/466; 49/360; 49/324; 296/155
(58) Field of Classification Search .................. 318/466, 318/468, 280–282; 49/31, 138, 209, 322, 49/324, 360; 296/155
See application file for complete search history.

(56) References Cited

U.S. PATENT DOCUMENTS

| 4,563,625 | A  | * | 1/1986  | Kornbrekke et al. | ......... 318/603 |
| 5,069,000 | A  |   | 12/1991 | Zuckerman |  |
| 5,833,301 | A  |   | 11/1998 | Watanabe et al. |  |
| 6,081,088 | A  |   | 6/2000  | Ishihara et al. |  |
| 6,208,102 | B1 | * | 3/2001  | Kikuchi et al. | ............... 318/466 |
| 6,425,206 | B1 |   | 7/2002  | Noda et al. |  |
| 6,430,875 | B1 |   | 8/2002  | Clark et al. |  |
| 6,580,243 | B2 |   | 6/2003  | Itami et al. |  |
| 6,659,539 | B2 |   | 12/2003 | Yogo et al. |  |
| 6,766,273 | B2 |   | 7/2004  | Kahles |  |
| 6,814,394 | B2 |   | 11/2004 | Yogo et al. |  |
| 6,877,280 | B2 |   | 4/2005  | Yokomori |  |
| 6,904,717 | B2 |   | 6/2005  | Clark et al. |  |
| 6,943,515 | B2 | * | 9/2005  | Kidokoro | ...................... 318/466 |
| 7,175,228 | B2 |   | 2/2007  | Mrkovic et al. |  |
| 7,212,897 | B2 |   | 5/2007  | Suzuki et al. |  |
| 7,267,391 | B2 | * | 9/2007  | Yokomori | ..................... 296/155 |
| 7,646,158 | B2 | * | 1/2010  | Suzuki et al. | ................ 318/280 |
| 7,698,855 | B2 | * | 4/2010  | Imai et al. | ........................ 49/360 |
| 2001/0022049 | A1 |   | 9/2001  | Clark et al. |  |

FOREIGN PATENT DOCUMENTS

| JP | 58-080082 A | 5/1983 |
| JP | 05-104950 A | 4/1993 |
| JP | 10-212866 A | 8/1998 |
| JP | 11-166356 A | 6/1999 |
| JP | 11-166358 A | 6/1999 |

* cited by examiner

*Primary Examiner* — Walter Benson
*Assistant Examiner* — Eduardo Colon-Santana
(74) *Attorney, Agent, or Firm* — Foley & Lardner LLP

(57) ABSTRACT

A device for controlling a speed of a door includes a detecting unit that detects a position of the door, and a control unit that controls the speed of the door in such a manner that an acceleration of the door becomes substantially zero at a point that is calculated based on the position. Thus, a target maximum speed of the door is adjusted depending on the remaining moving distance.

4 Claims, 7 Drawing Sheets

RELATED ART

RELATED ART

DOOR OPENING/CLOSING CONTROL DEVICE

The present application is a divisional of U.S. application Ser. No. 11/317,081, filed Dec. 27, 2005, which claims priority from Japanese Patent Application 2004-379882, filed Dec. 28, 2004, which are incorporated by reference in its entirety.

BACKGROUND OF THE INVENTION

1. Field of the Invention

The present invention relates to a device for controlling opening and closing of a door.

2. Description of the Related Art

Conventionally, a device for controlling opening and closing of a door is applied to a vehicle. A conventional device controls an opening/closing operation speed for a slide door of a vehicle. When the slid door is operated to be opened or closed, the device controls the opening/closing operation speed to be decreased when the slide door reaches a predetermined point before the slide door is fully-open or fully-closed (for example, Japanese Patent Application Laid-Open No. H11-166356).

In another conventional technology, the device includes a tilt sensor that detects a stop posture of a vehicle. A speed instruction based on detection by the tilt sensor is output to a motor driver. The motor driver drives a motor according to the speed instruction to open or close the door. In other words, the opening/closing operation speed is adjusted depending on a posture of the vehicle (for example, Japanese Patent Application Laid-Open No. H5-104950).

In the conventional technology disclosed in Japanese Patent Application Laid-Open No. H11-166356, the opening/closing operation speed is reduced from a predetermined point before the door is fully-open or fully-closed. Until the door reaches the point, the door is controlled to increase the opening/closing operation speed to its maximum speed, which is set in advance. With this configuration, however, even when the door is operated to be fully open or fully closed from a position in which the door is in a half-opened state, the device controls to accelerate the opening/closing operation speed to the maximum speed until the door reaches the point. In other words, even if the door is positioned a little before the point, the door is controlled to accelerate the opening/closing operation speed to the maximum speed, and then, to decelerate the opening/closing operation speed when the door reaches the point. The door is accelerated to the maximum speed even when a distance for which the door is moved is short since the door is almost fully-open or fully closed. This can make an operator feel that the speed is too high. In addition, since the door is then decelerated from the point, the operator can feel uncomfortable in that the speed of the door changes rapidly.

Even if a speed pattern in opening and closing the door is changed according to a posture of the vehicle as in the conventional technology disclosed in Japanese Patent Application Laid-Open No. H5-104950, the door is opened and closed according to a predetermined speed instruction pattern. Consequently, since the door is accelerated to the maximum speed even when the door is in the half-opened state, the same problem occurs.

SUMMARY OF THE INVENTION

It is an object of the present invention to at least solve the problems in the conventional technology.

A device according to one aspect of the present invention is for controlling a speed of movement of the door and includes a detecting unit configured to detect a present position of the door; and a control unit configured to control the speed of the door in such a manner that an acceleration of the door becomes substantially zero at a point that is calculated based on the present position.

A method according to another aspect of the present invention is of controlling a speed of movement of the door and includes detecting a present position of the door; and controlling the speed of the door in such a manner that an acceleration of the door becomes substantially zero at a point that is calculated based on the present position.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention are explained in detail below with reference to the accompanying drawings. Note that the present invention is not limited to the embodiments below.

Figure 1:
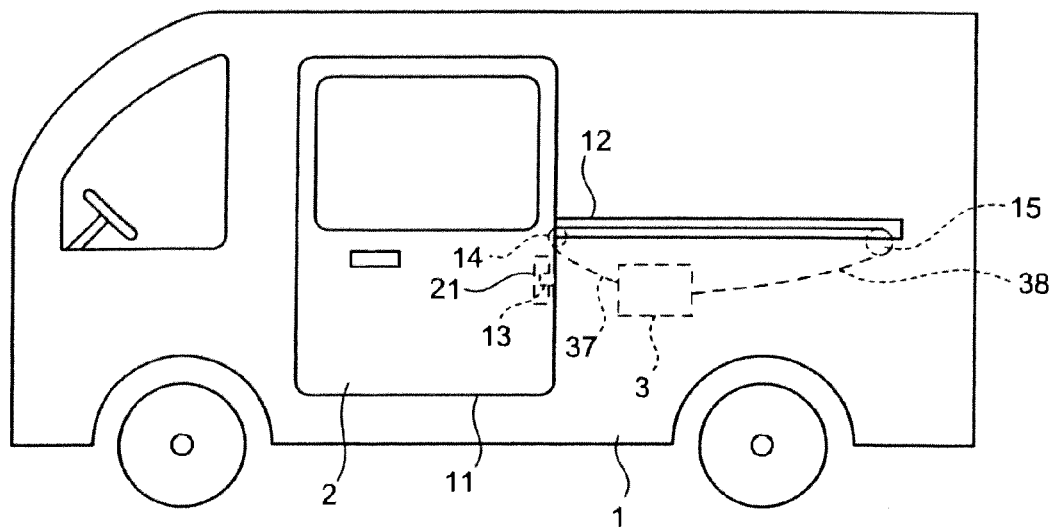
FIG. 1 is a side view of a vehicle provided with a door opening/closing control device according to an embodiment of the present invention.
Figure 2:
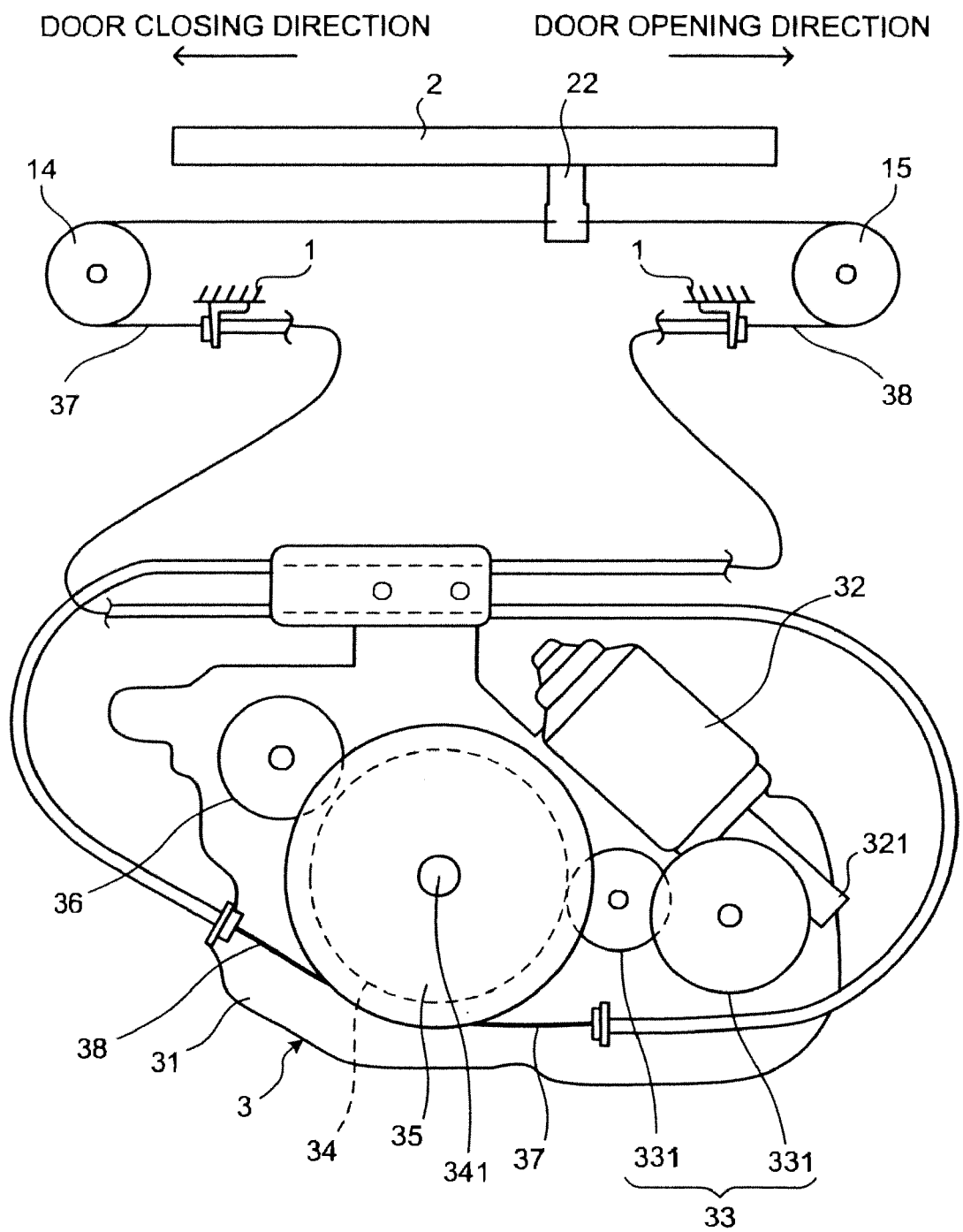
FIG. 2 is a schematic of a driving system of the door opening/closing control device.

FIG. 1 is a side view of a vehicle provided with a door opening/closing control device in an embodiment of the present invention. FIG. 2 is a schematic of a driving system of the door opening/closing control device.

A door opening/closing apparatus 3 according to the embodiment moves a slide door (hereinafter, "door") 2 that opens and closes an opening 11 formed on a side of a vehicle body 1. The door 2 is provided such that the door is slidable along a guide rail 12 in a front to rear direction of the vehicle body 1. The guide rail 12 holds an upper end and a lower end of the door 2.

The door 2 includes a latch mechanism 21 that is engages with a striker 13 provided in the opening 11. The latch mechanism 21 is engaged with the striker 13 when the door 2 reaches a position that brings the door 2 in a fully-closed state so that the door 2 is held in the fully-closed state. The latch mechanism 21 is a conventional latch mechanism and takes a half-latch state, in which the latch mechanism 21 temporarily holds the door 2 before the door 2 is fully-closed, and a full-latch state, in which the latch mechanism 21 holds the door 2 at a position at which the door 2 is fully-closed. Furthermore, the latch mechanism 21 includes a closer mechanism and a release mechanism. The closer mechanism brings the striker 13 into the full-latch state when the half-latch state is detected. The release mechanism includes a solenoid for bringing the striker 13 into an unlatch state for releasing the door 2 from the full-latch state according to a door opening instruction. The closer mechanism and the release mechanism are also known technology. Moreover, a latch mechanism for holding the door 2 in a fully-open state is provided between the vehicle body 1 and the door 2. The latch mechanism includes a release mechanism.

The door opening/closing control device 3 is fixed to the vehicle body 1 via a base plate 31. As shown in FIG. 2, the base plate 31 includes a driving motor 32, a deceleration mechanism 33, a clutch 34, a wire drum 35, and an electromagnetic brake 36.

The driving motor 32 is fixed to the base plate 31 sideways. A worm gear 321 is provided in an output shaft (not shown) of the driving motor 32.

The deceleration mechanism 33 includes a plurality of deceleration gears 331 that mesh with each other. The deceleration gear 331 on an input side of the deceleration mechanism 33 is meshed with the worm gear 321 of the driving motor 32.

The clutch 34 includes a clutch shaft 341. A gear (not shown) provided in the clutch shaft 341 is meshed with the deceleration gear 331 on an output side of the deceleration mechanism 33. Rotation of the driving motor 32 is transmitted to the clutch shaft 341 of the clutch 34 via the deceleration mechanism 33. The clutch 34 in this embodiment is constituted as an electromagnetic clutch. The clutch 34 freely switches the rotation of the driving motor 32, which is transmitted to the clutch shaft 341, electrically to couple and uncouple the clutch 34 to and from a driving system in a later stage of the clutch shaft 341.

The wire drum 35 is rotatably arranged around the clutch shaft 341. The wire drum 35 is constituted as the driving system in a later stage of the clutch shaft 341. The deceleration mechanism 33 and the wire drum 35 are freely switched into the coupled state and the uncoupled state electrically by the clutch 34. One end sides of two wire cables 37 and 38 are wound around the wire drum 35, respectively. The other end side of one wire cable 37 is coupled to a bracket 22, which extends from the door 2 through a front side pulley 14 pivotally supported to be rotatable on the vehicle body 1 side. The other end side of the other wire cable 38 is coupled to the bracket 22 through a rear side pulley 15 pivotally supported to be rotatable on a side of the vehicle body 1.

The electromagnetic brake 36 is actuated by electrical control to apply braking to the wire drum 35.

In the door opening/closing control device 3 described above, by driving the driving motor 32, the wire drum 35 rotates around the clutch shaft 341 via the deceleration mechanism 33 and the clutch 34 that is in the coupled state. When the wire drum 35 rotates clockwise in FIG. 2, one wire cable 37 is wound by the wire drum 35 and the other wire cable 38 is pulled out from the wire drum 35. Thus, the door 2 moves in a direction toward to the front side pulley 14 to close the opening 11. Conversely, when the wire drum 35 rotates counterclockwise, one wire cable 37 is pulled out from the wire drum 35 and the other wire cable 38 is wound by the wire drum 35. As a result, the door 2 moves in a direction toward the rear side pulley 15 to open the opening 11.

If a door stop is instructed while an opening operation or a closing operation of the door 2, the door 2 is stopped at a halfway position in which the door 2 closes the opening 11 halfway. In this case, the driving by the driving motor 32 is stopped. Braking is applied to the wire drum 35 by the electromagnetic brake 36 in addition to a braking force of the driving motor 32 to stop the door 2. The door 2 is kept to be stopped at the halfway position by maintaining the clutch 34 in the coupled state or maintaining the braking control of the electromagnetic brake 36. Note that the clutch 34 is in the uncoupled state when the door 2 is in the fully-open state and the fully-closed state. The clutch 34 and the electromagnetic brake 36 do not always have to be provided separately. For example, an electromagnetic brake may be formed integrally with a clutch.

Figure 3:
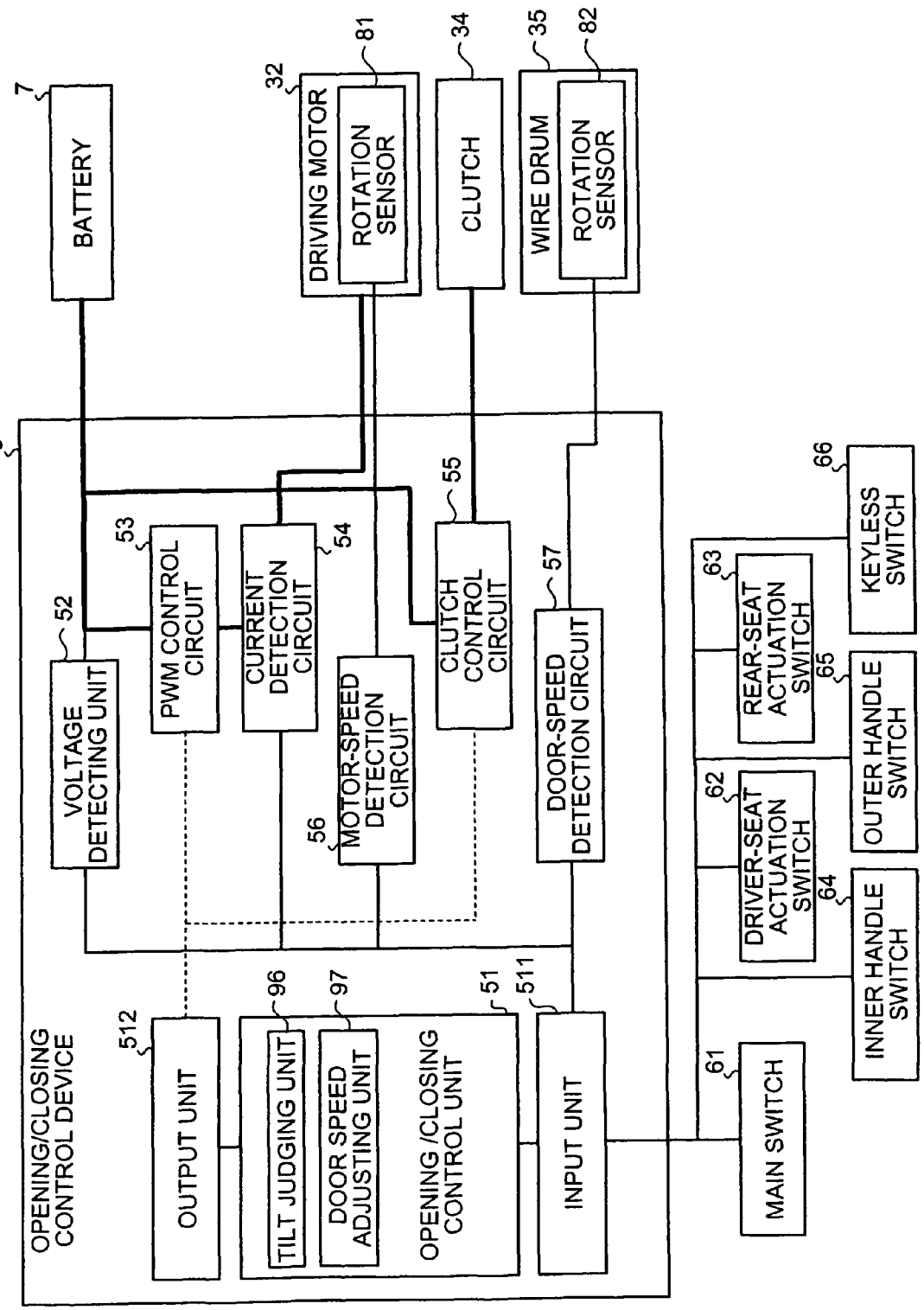
FIG. 3 is a block diagram of a control system of the door opening/closing control device.

FIG. 3 is a block diagram of a control system of a door opening/closing control device. An opening/closing control device 5 shown in FIG. 3 includes an opening/closing control unit 51 for collectively controlling the door opening/closing control device 3 according to data and a program stored therein in advance. A voltage detecting unit 52, a pulse width modulation (PWM) control circuit 53, a current detection circuit 54, and a clutch control circuit 55 are connected to the opening/closing control unit 51 as a power supply system. The voltage detecting unit 52 and the current detection circuit 54 are connected to the opening/closing control unit 51 via an input unit 511. The PWM control circuit 53 and the clutch control circuit 55 are connected to the opening/closing control unit 51 via an output unit 512. A motor-speed detection circuit 56 and a door-speed detection circuit 57 are also connected to the opening/closing control unit 51 as a detection system via the input unit 511. Moreover, a main switch 61, a driver-seat actuation switch 62, a rear-seat actuation switch 63, an inner handle switch 64, an outer handle switch 65, and a keyless switch 66 are also connected to the opening/closing control unit 51 as a group of switches via the input unit 511.

The voltage detecting unit 52 is a unit for detecting a voltage at a battery 7 mounted on the vehicle body 1. The voltage detected by the voltage detecting unit 52 is input to the opening/closing control unit 51 via the input unit 511. The voltage at the battery 7 is supplied from the PWM control circuit 53 to the driving motor 32 through the current detection circuit 54. Moreover, the voltage at the battery 7 is supplied to the clutch 34 through the clutch control circuit 55.

The PWM control circuit 53 is a circuit for controlling a voltage supplied to the driving motor 32. Motor rotational speed of the driving motor 32, that is, moving speed of the door 2 is changed by changing application time of a voltage.

The current detection circuit 54 is a circuit for detecting a current value applied to the driving motor 32. Note that adjustment of an output of the driving motor 32 by the PWM control circuit 53 is performed through adjustment of voltage application time (DUTY control) in one cycle (e.g., 2000 Hz). At the time of a maximum output, since a DUTY ratio is 100%, a voltage waveform is that of a DC voltage. Thus, it is possible to directly measure an actual load current value of the driving motor 32 in the current detection circuit 54. On the other hand, since a DUTY ratio in an acceleration area and a deceleration area is less than 100%, a waveform of an applied voltage appears in pulse. Thus, the driving motor 32 is substantially AC driven. In this AC driven area, since a current value fluctuates continuously, it is necessary to level the current value. Thus, the current detection circuit 54 multiplies an AC current value by a predetermined correction coefficient to obtain a corrected current value based on an actual load of the driving motor 32.

The clutch control circuit 55 is a circuit for supplying a voltage from the battery 7 to the clutch 34 and instructing driving of the clutch 34.

The motor-speed detection circuit 56 is a circuit for obtaining a signal from a rotation sensor 81 disposed in the driving motor 32 and mainly detecting rotational speed of the motor.

The rotation sensor 81 is provided over a rotation shaft, to which rotation of the output shaft of the driving motor 32 is transmitted without being decelerated, such as a rotation shaft to which the deceleration gear 331 on the input side meshing with the worm gear 321 is fixed. The rotation sensor 81 includes a permanent magnet of a disc shape, which is provided to be rotatable with the rotation shaft, and two hall elements (hall ICs) for detecting rotation of the permanent magnetic disc. The respective Hall elements detect rotation of the permanent magnetic disc and output pulse signals of phases different from each other. The motor-speed detection circuit 56 detects rotational speed and a rotation direction of the driving motor 32 by obtaining different pulse signals.

The door-speed detection circuit 57 is a circuit for obtaining signals from a rotation sensor 82 arranged in the wire drum 35 and mainly detecting moving speed of the door 2. The rotation sensor 82 is provided over a rotation shaft to which rotation of the wire drum 35 is transmitted without being decelerated. The rotation sensor 82 has the same constitution as the rotation sensor 81. The door-speed detection circuit 57 detects a moving speed, a moving direction, and positions at which the door 2 is open or closed by obtaining different pulse signals.

The main switch 61 among the group of switches is a switch for enabling opening and closing control of the door opening/closing control device 4. Only when the main switch 61 is on, it is possible to perform opening and closing control of the door opening/closing control device 4. Therefore, when the main switch 61 is off, the door 2 is opened and closed manually. The other switches (the driver-seat actuation switch 62, the rear-seat actuation switch 63, the inner handle switch 64, the outer handle switch 65, and the keyless switch 66) output instruction signals for moving or stopping the door 2, respectively.

The opening/closing control unit 51 includes a tilt judging unit 96 and a door speed adjusting unit 97.

The tilt judging unit 96 judges whether the vehicle body 1 is tilted, for example, tilted down forward or tilted down backward. According to the motor rotational speed detected by the motor-speed detection circuit 56 and the door moving speed detected by the door-speed detection circuit 57, when a speed difference increases between the motor rotational speed and the door moving speed, the tilt judging unit 96 judges that the vehicle body 1 is tilted.

The door speed adjusting unit 97 adjusts moving speed of the door 2 according to conditions at the time of opening and closing the door 2.

Figure 4:
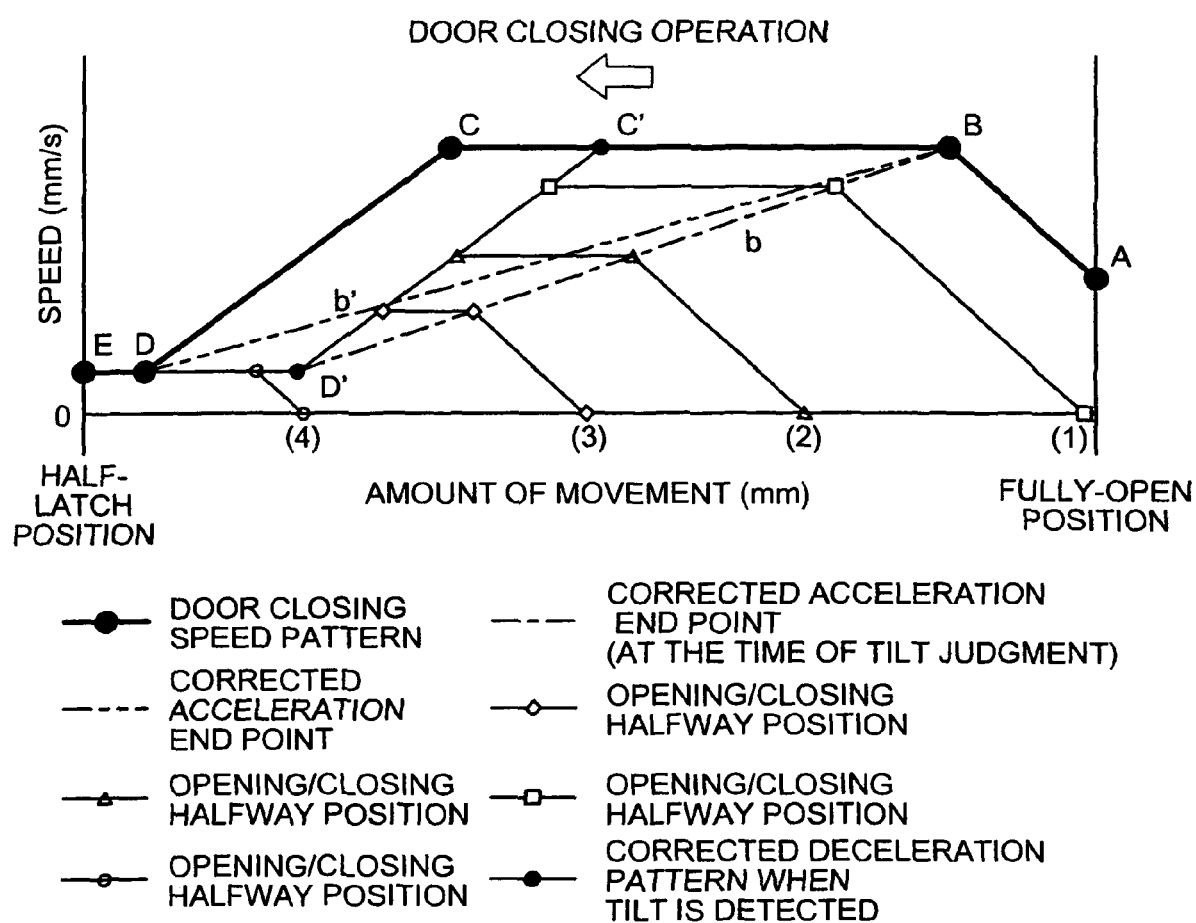
FIG. 4 is a graph of a relation between an amount of movement and a speed in a closing operation of a door.

FIG. 4 is a graph of a relation between an amount of movement and a speed in a door closing operation.

The door speed adjusting unit 97 has a reference door closing-speed pattern (A-B-C-D-E) as indicated by a bold line in FIG. 4. According to the door-closing speed pattern, the door closing operation is performed staring from a fully-open position (A). The door speed adjusting unit 97 moves the door 2 at predetermined acceleration in a section from the fully-open position (A) to a reference acceleration end point (B). The door speed adjusting unit 97 moves the door 2 at fixed door speed (target maximum speed) in a section from the reference acceleration end point (B) to a deceleration start point (C). The door speed adjusting unit 97 decelerates the door 2 in a section from the deceleration start point (C) to a deceleration end point (D). The door speed adjusting unit 97 moves the door 2 at fixed door speed (low speed) in a section from the deceleration end point (D) to a half-latch position (E). Note that, in the fully-open position (A), the clutch 34 is in the uncoupled state. When the door closing operation is started, after driving the driving motor 32, the door speed adjusting unit 97 brings the clutch 34 into the coupled state to accelerate the door 2. As shown in FIG. 4, in the door closing operation from the fully-open position (A), since the driving motor 32 is preliminarily rotated, the door 2 accelerates involving speed in advance. In the door closing direction from the half-latch position (E), the movement of the door 2 is taken over by the closer mechanism until the door 2 reaches the full-latch state in the latch mechanism 21.

At the time of the door closing operation, when the tilt judging unit 96 judges that the vehicle body 1 is tilted downward with respect to the door closing direction, the door speed adjusting unit 97 adjusts the door-closing speed pattern. Specifically, as shown in FIG. 4, the door speed adjusting unit 97 adjusts the door-closing speed pattern to a corrected deceleration pattern from a tilt corrected deceleration start point (C') to a tilt corrected deceleration end point (D') obtained by bringing forward the section from the deceleration start point (C) to the deceleration end point (D) in which the door 2 is decelerated. The door speed adjusting unit 97 moves the door 2 at the fixed door speed (low speed) in the same manner as the door-closing speed pattern in a section from the tilt corrected deceleration end point (D') to the half-latch position (E). The section from the tilt corrected deceleration end point (D') to the deceleration end point (D) corresponds to a curved portion of the guide rail 12 for pushing the door 2 onto the vehicle body 1 side. Since the section for decelerating the door 2 in the tilted state is brought forward, door speed is controlled to be low when the door 2 reaches the curved portion of the guide rail 12. Thus, it is possible to stabilize behavior of the door 2 passing the curve portion.

When the door closing operation is started from a halfway position (including a case when the door 2 is reversed to close from the door opening operation), the door speed adjusting unit 97 adjusts the door-closing speed pattern. Specifically, when the door closing operation is started from one of halfway positions (e.g., positions of (1), (2), (3), and (4) shown in FIG. 4), the door speed adjusting unit 97 sets a corrected acceleration end point (b) leading from the reference acceleration end point (B) to the tilt corrected deceleration end point (D') as indicated by an alternate long and short dash line in FIG. 4.

When the door closing operation is started from the halfway positions (1), (2), and (3), the door speed adjusting unit 97 moves the door 2 at the same predetermined acceleration as the section from the fully-open state (A) to the reference acceleration end point (B). When the door 2 reaches the corrected acceleration end point (b), the door speed adjusting unit 97 stops acceleration. Thereafter, the door speed adjusting unit 97 moves the door 2 with speed at each acceleration end time set as fixed door speed (corrected target maximum speed). In a position where the door 2 reaches a section from the tilt corrected deceleration start point (C') to the tilt corrected deceleration end point (D'), the door speed adjusting unit 97 decelerates the door 2 along the section. In a section from the tilt corrected deceleration end point (D') to the half-latch position (E), the door speed adjusting unit 97 moves the door 2 at the fixed door speed (low speed) in the same manner as the door-closing speed pattern.

When the door closing operation is started from the halfway position (4) as shown in FIG. 4, the door 2 does not reach the corrected acceleration end point (b) but reaches the section from the tilt corrected deceleration end point (D') to the half-latch position (E). In this case, the door speed adjusting unit 97 moves the door 2 at the fixed door speed (low speed).

Note that the door closing operation from the halfway positions (1), (2), (3), and (4) is start from the coupled state of the clutch 34.

In this way, when the door closing operation is started from the halfway positions, the door speed adjusting unit 97 sets the corrected acceleration end point (b) corresponding to a remaining moving distance in the door closing direction and moves the door 2 at predetermined acceleration to the corrected acceleration end point (b). When the door closing operation is started from the halfway positions without setting the corrected acceleration end point (b), the door speed adjusting unit 97 moves the door 2 at the predetermined acceleration until the door 2 reaches an acceleration end point that is a section of the reference acceleration end point (B), the tilt corrected deceleration start point (C'), and the tilt corrected deceleration end point (D'). Thus, an operator is given a sense of incongruity to feel that door speed is high even when an amount of opening of the door 2 is small. On the other hand, the door speed adjusting unit 97 lowers the acceleration end point according to a remaining moving distance in the door closing direction by setting the corrected acceleration end point (b). Therefore, when the door closing operation is started from the respective halfway positions (1), (2), (3), and (4), it is possible to move the door 2 at corrected target maximum speed obtained by reducing the target maximum speed in the door-closing speed pattern according to a remaining moving distance in the door closing direction from the respective halfway positions (1), (2), (3), and (4). As a result, it is possible to move the door 2 at speed that does not give a sense of incongruity to the operator. Moreover, near the section from the tilt corrected deceleration start point (C') to the tilt corrected deceleration end point (D'), acceleration and deceleration of the door 2 never change suddenly. Thus, a sense of incongruity is never given to the operator.

The door-closing speed pattern in starting the door closing operation from the halfway positions is adjusted according to the door-closing speed pattern that is adjusted when it is judged by the tilt judging unit 96 that the vehicle body 1 is in the tilted state. The door speed adjusting unit 97 moves the door 2 at a target maximum speed obtained by bringing forward the section for decelerating the door 2 in the tilted state and reducing the target maximum speed according to a remaining moving distance in the door closing direction in the door closing operation from the respective halfway positions (1), (2), (3), and (4). As a result, it is possible to obtain both effects of the door closing operation at the time of judgment of the tilted state and the door closing operation from the halfway positions.

Note that, when the door closing operation is started from the halfway positions rather than at the time of judgment of the tilted state, the door speed adjusting unit 97 adjusts a usual door-closing speed pattern. In this case, in this embodiment, the door speed adjusting unit 97 sets a corrected acceleration end point (b') from the acceleration end point (B) to the acceleration end point (D) as indicated by an alternate long and two short dashes line in FIG. 4.

In the door opening operation from the halfway position (1), (2), (3), and (4), the door speed adjusting unit 97 moves the door 2 at the same predetermined acceleration as the section from the fully-closed state (A) to the acceleration end point (B) and stops acceleration when the door 2 reaches the corrected acceleration end point (b'). Thereafter, the door speed adjusting unit 97 moves the door 2 with speed at each acceleration end time set as fixed door speed (corrected target maximum speed) and, when the door 2 reaches the section from the deceleration start point (C) to the deceleration end point (D), decelerates the door 2 along the section. The door speed adjusting unit 97 moves the door 2 at the fixed door speed (low speed) in the section from the deceleration end point (D) to the half-latch position (E).

In this way, when the door closing operation is started from the halfway positions rather than judgment of the tilted state, the door speed adjusting unit 97 sets the corrected acceleration end point (b') corresponding to a remaining moving distance in the door closing direction and moves the door 2 at predetermined acceleration to the corrected acceleration end point (b'). When the door speed adjusting unit 97 starts the door closing operation from the halfway positions without setting the corrected acceleration end point (b'), the door speed adjusting unit 97 moves the door 2 at the predetermined acceleration until the door 2 reaches an acceleration end point that is a section of the reference acceleration end point (B), the deceleration start point (C), and the deceleration end point (D). Thus, the operator is given a sense of incongruity to feel that door speed is high even when an amount of opening of the door 2 is small. On the other hand, the door speed adjusting unit 97 lowers the acceleration end point according to a remaining moving distance in the door closing direction by setting the corrected acceleration end point (b). Therefore, when the door closing operation is started from the respective halfway positions (1), (2), (3), and (4), it is possible to move the door 2 at corrected target maximum speed obtained by reducing the target maximum speed in the door-closing speed pattern according to a remaining moving distance in the door closing direction from the respective halfway positions (1), (2), (3), and (4). As a result, it is possible to move the door 2 at speed that does not give a sense of incongruity to the operator. Moreover, near the section from the deceleration start point (C) to the deceleration end point (D), acceleration and deceleration of the door 2 never change suddenly. Thus, a sense of incongruity is never given to the operator.

Figure 5:
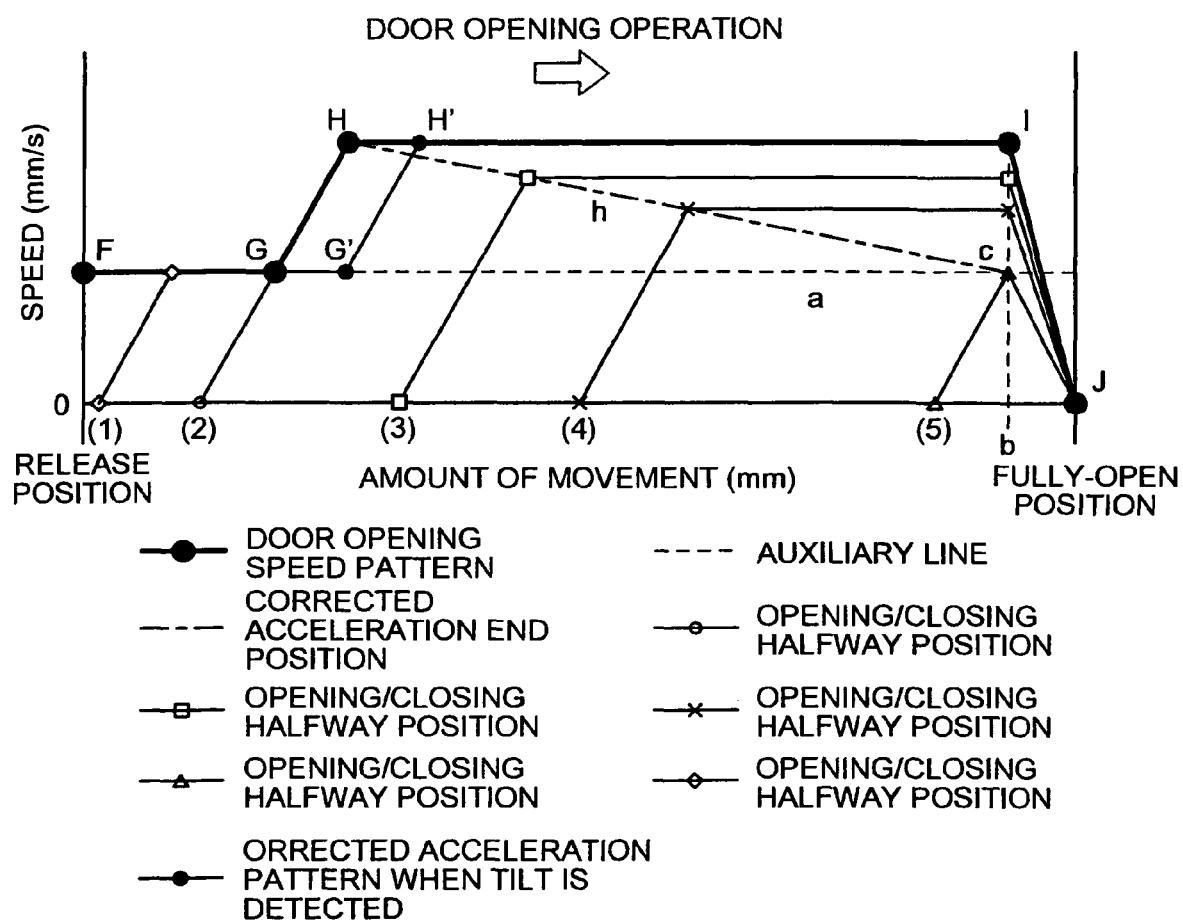
FIG. 5 is a graph of a relation between an amount of movement and a speed in an opening operation of a door.

FIG. 5 is a graph of a relation between an amount of movement and a speed in a door opening operation.

The door speed adjusting unit 97 has a reference door opening pattern (F-G-H-I-J) as indicated by a bold line in FIG. 5. The door opening speed pattern is a pattern at the time when a door opening operation is started from a fully-closed state (in this embodiment, a release position where the release mechanism brings the striker 13 into the unlatch state in the latch mechanism 21). The door speed adjusting unit 97 moves the door 2 at fixed door speed (low speed) in a section from a release position (F) to an acceleration start position (G). The door speed adjusting unit 97 moves the door 2 at predetermined acceleration in a section from the acceleration start position (G) to a reference acceleration end point (H). The door speed adjusting unit 97 moves the door 2 at fixed door speed (target maximum speed) in a section from the reference acceleration end point (H) to a deceleration start point (I). The door speed adjusting unit 97 decelerates the door 2 in a section from the deceleration start point (I) to a fully-open position (J). Note that, in the release position (F), the clutch 34 is in the uncoupled state. When the door opening operation is started, after driving the driving motor 32, the door speed adjusting unit 97 brings the clutch 34 into the coupled state to accelerate the door 2. As shown in FIG. 5, in the door opening operation from the release position (F), since the driving motor 32 is preliminarily rotated, the door 2 accelerates involving speed in advance.

During the door opening operation, when the tilt judging unit 96 judges that the vehicle body 1 is tilted downward with respect to the door opening direction, the door speed adjusting unit 97 adjusts the door opening speed pattern. Specifically, as shown in FIG. 5, the door speed adjusting unit 97 adjusts the door opening speed pattern to a corrected acceleration pattern from a tilt corrected acceleration start position (G') to a tilt corrected acceleration end point (H') obtained by delaying the section from the acceleration start position (G) to the reference acceleration end point (H) in which the door 2 is accelerated. The door speed adjusting unit 97 moves the door 2 at the fixed door speed (target maximum speed) in the same manner as the door opening speed pattern in a section from the tilt corrected acceleration end point (H') to the deceleration start point (I). The section from the acceleration start position (G) to the corrected acceleration start position (G') corresponds to a curved portion of the guide rail 12 for pulling out the door 2 from the vehicle body 1 side. Since the section for accelerating the door 2 in the tilted state is delayed, door speed is controlled to be low when the door 2 reaches the curved portion of the guide rail 12. Thus, it is possible to stabilize behavior of the door 2 passing the curve portion.

When the door opening operation is started from a halfway position (including the case when the door 2 is reversed to open from the door closing operation), the door speed adjusting unit 97 adjusts the door-closing speed pattern. Specifically, when the door opening operation is started from halfway positions (e.g., positions of (1), (2), (3), (4), and (5) shown in FIG. 5), the door speed adjusting unit 97 sets a corrected acceleration end point (h) as indicated by an alternate long and short dash line in FIG. 5. As the corrected acceleration end point (h), the door speed adjusting unit 97 calculates an intersection (c) of a low speed auxiliary line (a) based on low speed, which leads from the release position (F) to the acceleration start position (G), and a deceleration auxiliary line (b) based on the deceleration start point (I) and sets the corrected acceleration end point (h) leading from the reference acceleration end point (H) to the intersection (c).

In the door opening operation from the halfway positions (3), (4), and (5), the door speed adjusting unit 97 moves the door 2 at the same predetermined acceleration as the section from the acceleration start position (G) to the acceleration end point (H). When the door 2 reaches the corrected acceleration end point (h), the door speed adjusting unit 97 stops acceleration. Thereafter, the door speed adjusting unit 97 moves the door 2 with speed at each acceleration end time set as fixed door speed (corrected target maximum speed). In a position where the door 2 reaches the deceleration start auxiliary line (b), the door speed adjusting unit 97 decelerates the door 2 up to the fully-open state (J).

When the door opening operation is started from one of the halfway positions (1) and (2) as shown in FIG. 5, the door speed adjusting unit 97 moves the door 2 at the same predetermined acceleration as the section from the acceleration start position (G) to the acceleration end point (H). After the door 2 reaches the section from the release position (F) to the acceleration start position (G), the door speed adjusting unit 97 moves the door 2 following the door opening speed pattern. Although not shown in the figure, when the door opening operation is started from a halfway position closer to the fully-open state (J) than the halfway position (5), the door speed adjusting unit 97 moves the door 2 at the predetermined acceleration until the door reaches the deceleration start auxiliary line (b), although not reaching the corrected acceleration end point (h). The door speed adjusting unit 97 decelerates the door 2 from a position where the door 2 reaches the deceleration start auxiliary line (b) to the fully-open state (J).

Note that the door opening operation from the halfway positions (1), (2), (3), (4), and (5) is start from the coupled state of the clutch 34. In particular, since the door opening operation from the halfway positions (1) and (2) is start from the coupled state of the clutch 34, the driving motor 32 is not preliminarily rotated and the door 2 never involves speed in advance. The door speed adjusting unit 97 does not have to move the door 2 following the section from the corrected acceleration start position (G') to the tilt corrected acceleration end point (H') that are adjusted according to tilt judgment.

In this way, when the door opening operation is started from the halfway positions, the door speed adjusting unit 97 sets the corrected acceleration end point (h) according to a remaining moving distance in the door opening direction and moves the door 2 at predetermined acceleration to the corrected acceleration end point (h). When the door opening operation is started from the halfway positions without setting the corrected acceleration end point (h), the door speed adjusting unit 97 moves the door 2 at the predetermined acceleration until the door 2 reaches an acceleration end point that is a section of the reference acceleration end point (H), the deceleration start point (I), and the fully-open state (J). Thus, an operator is given a sense of incongruity to feel that door speed is high even when an amount of opening of the door 2 is small. On the other hand, the door speed adjusting unit 97 lowers the acceleration end point according to a remaining moving distance in the door opening direction by setting the corrected acceleration end point (h). Therefore, when the door opening operation is started from the respective halfway positions (3), (4), and (5), it is possible to move the door 2 at corrected target maximum speed obtained by reducing the target maximum speed in the door opening speed pattern according to a remaining moving distance in the door opening direction from the respective halfway positions (3), (4), and (5). As a result, it is possible to move the door 2 at speed that does not give a sense of incongruity to the operator. Moreover, near the section from the deceleration start point (I) to the fully-open state (J), acceleration and deceleration of the door 2 never change suddenly. Thus, a sense of incongruity is never given to the operator.

Incidentally, in the door opening/closing control device 3, when an amount of door movement is large, the door speed adjusting unit 97 sets the corrected acceleration end point by dividing the section between the fully-open state and the fully-closed state (the half-latch position or the release position) into at least two sections.

Figure 6:
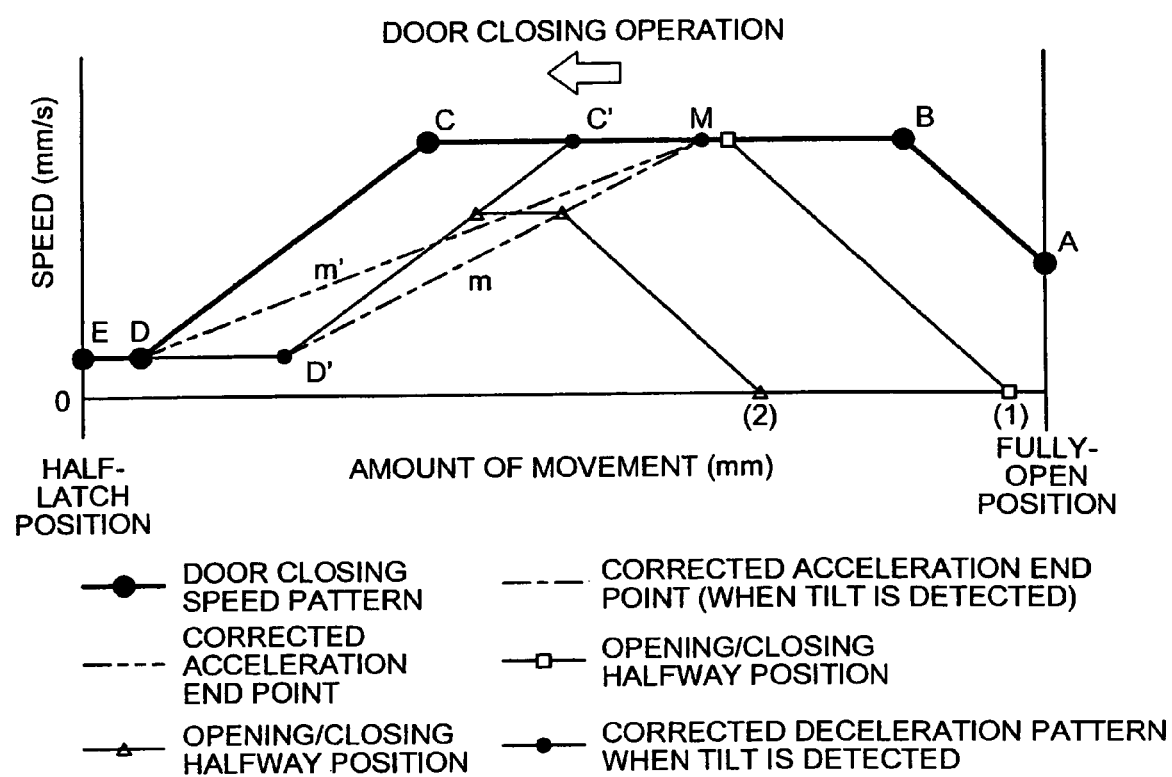
FIG. 6 is a graph of a relation between an amount of movement and a speed in the closing operation when the amount of door movement is rather large.

FIG. 6 is a graph of a relation between an amount of movement and a speed in the door closing operation when the amount of door movement is rather large.

As shown in FIG. 6, the door speed adjusting unit 97 sets a dividing position (M) for dividing the section between the fully-open state (A) and the half-latch position (E) into two sections in the door-closing speed pattern (A-B-C'-D'-E). Specifically, the door speed adjusting unit 97 sets the dividing position (M) in the section between a reference acceleration end point (B) and a tilt corrected deceleration start point (C') in which the door 2 is moved at target maximum speed. When the door closing operation is started from a halfway position (including the case when the door 2 is reversed to close from the door opening operation), the door speed adjusting unit 97 adjusts the door-closing speed pattern. Specifically, when the door closing operation is started from one of halfway positions (e.g., positions of (1) and (2) shown in FIG. 6), the door speed adjusting unit 97 sets a corrected acceleration end point (m) leading from the dividing position (M) to a tilt corrected deceleration end point (D') as indicated by an alternate long and short dash line in FIG. 6.

When the door closing operation is started from the halfway position (2), the door speed adjusting unit 97 moves the door 2 at the same predetermined acceleration as the section from a fully-open position (A) to the reference acceleration end point (B). When the door 2 reaches the corrected acceleration end point (m), the door speed adjusting unit 97 stops acceleration. Thereafter, the door speed adjusting unit 97 moves the door 2 with speed at each acceleration end time set as fixed door speed (corrected target maximum speed). In a position where the door 2 reaches a section from the tilt corrected deceleration start point (C') to the tilt corrected deceleration end point (D'), the door speed adjusting unit 97 decelerates the door 2 along the section. In a section from the tilt corrected deceleration end point (D') to a half-latch position (E), the door speed adjusting unit 97 moves the door 2 at the fixed door speed (low speed) in the same manner as the door-closing speed pattern.

On the other hand, when the door closing operation is started from the halfway position (1), the door speed adjusting unit 97 moves the door 2 at the same predetermined acceleration as the section from the fully-open state (A) to the reference acceleration end point (B). When the door 2 reaches the door-closing speed pattern, the door speed adjusting unit 97 stops acceleration. Thereafter, the door speed adjusting unit 97 moves the door 2 according to the door-closing speed pattern.

In this way, when the door closing operation for the door 2 with a large amount of door movement is started from the halfway positions, the door speed adjusting unit 97 sets the dividing position (M) in the section between the reference acceleration end point (B) and the tilt corrected deceleration start point (C') in which the door 2 is moved at the target maximum speed. The door speed adjusting unit 97 divides the door-closing speed pattern into a section in which a remaining distance in the moving direction of the door 2 is short and a section in which a remaining moving distance in the moving direction of the door 2 is long. Moreover, the door speed adjusting unit 97 sets the corrected acceleration end point (m) corresponding to a remaining moving distance in the door closing direction. In moving the door 2 at predetermined acceleration as in the door closing operation from the halfway position (2), when the door 2 reaches the corrected acceleration end point (m) (in the section in which a remaining moving distance in the moving direction of the door 2 is short), the door speed adjusting unit 97 moves the door 2 based on the corrected acceleration end point (m). On the other hand, in moving the door 2 at predetermined acceleration as in the door closing operation from the halfway position (1), when the door 2 reaches the acceleration end point that is a section between the reference acceleration end point (B) and the dividing position (M) (in the section in which a remaining moving distance in the moving direction of the door 2 is long), the door speed adjusting unit 97 moves the door 2 based on the acceleration end point. Therefore, in the section in which a remaining distance in the moving direction of the door 2 is short, it is possible to move the door 2 at corrected target maximum speed obtained by reducing the target maximum speed. On the other hand, in the section in which a remaining distance in the moving direction of the door 2 is long, it is possible to move the door 2 at the target maximum speed. As a result, when the door speed adjusting unit 97 starts to move the door 2 with a large amount of door movement from the halfway positions, it is possible to move the door 2 without giving a sense of incongruity to the operator at relatively low speed in the section in which the remaining distance is short and move the door 2 with reduced work time at relatively high speed in the section in which the remaining distance is long.

Note that, when the door closing operation is started from the halfway positions rather than at the time of judgment of the tilted state, the door speed adjusting unit 97 only has to set a corrected acceleration end point (m') leading from the dividing position (M) to the deceleration end point (D) as indicated by an alternate long and two short dashes line in FIG. 6.

Figure 7:
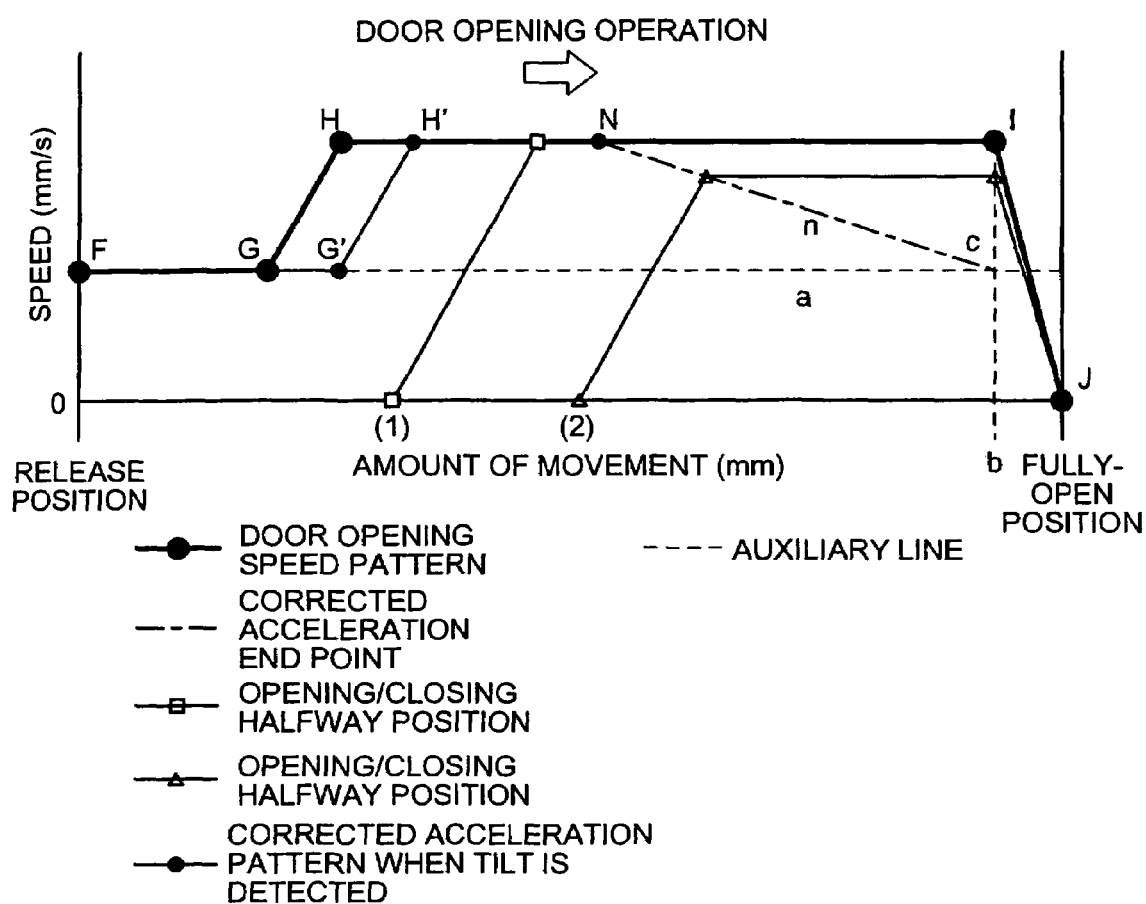
FIG. 7 is a graph of a relation between an amount of movement and a speed in the opening operation when the amount of door movement is rather large.

FIG. 7 is a graph of a relation between an amount of door movement and door speed in a door opening operation when the amount of door movement is rather large.

As shown in FIG. 7, the door speed adjusting unit 97 sets a dividing position (N) for dividing a section between the release position (F) and a fully-open position (J) into two sections in the door opening speed pattern (F-G-H-I-J). Specifically, the door speed adjusting unit 97 sets the dividing position (N) in a section between a reference acceleration end point (H) and a deceleration start point (I) in which the door 2 is moved at target maximum speed. When the door opening operation is started from a halfway position (including the case when the door 2 is reversed to open from the door closing operation), the door speed adjusting unit 97 adjusts the door opening speed pattern. Specifically, when the door opening operation is started from halfway positions (e.g., positions of (1) and (2) shown in FIG. 7), the door speed adjusting unit 97 sets a corrected acceleration end point (n) as indicated by an alternate long and short dash line in FIG. 7. As the corrected acceleration end point (n), the door speed adjusting unit 97 calculates an intersection (c) of a low speed auxiliary line (a) based on low speed, which leads from the release position (F) to an acceleration start position (G), and a deceleration auxiliary line (b) based on the deceleration start point (I) and sets the corrected acceleration end point (n) leading from the reference acceleration end point (H) to the intersection (c).

When the door opening operation is started from the halfway position (2), the door speed adjusting unit 97 moves the door 2 at the same predetermined acceleration as the section from the acceleration start position (G) to the acceleration end point (H). When the door 2 reaches the corrected acceleration end point (n), the door speed adjusting unit 97 stops acceleration. Thereafter, the door speed adjusting unit 97 moves the door 2 with speed at each acceleration end time set as fixed door speed (corrected target maximum speed). In a position where the door 2 reaches the deceleration start auxiliary line (b), the door speed adjusting unit 97 decelerates the door 2 up to the fully-open state (J).

On the other hand, when the door opening operation is started from the halfway position (1), the door speed adjusting unit 97 moves the door 2 at the same predetermined acceleration as the section from the acceleration start position (G) to the acceleration end point (H). When the door 2 reaches the door opening speed pattern, the door speed adjusting unit 97 stops acceleration. Thereafter, the door speed adjusting unit 97 moves the door 2 according to the door opening speed pattern.

Thus, when the door opening operation for the door 2 with a large amount of door movement is started from a halfway position, the door speed adjusting unit 97 sets the dividing position (N) in the section between the reference acceleration end point (H) and the deceleration start point (I) in which the door 2 is moved at the target maximum speed. The door speed adjusting unit 97 divides the door opening speed pattern into a section in which a remaining distance in the moving direction of the door 2 is short and a section in which a remaining moving distance in the moving direction of the door 2 is long. Moreover, the door speed adjusting unit 97 sets the corrected acceleration end point (n) corresponding to a remaining moving distance in the door opening direction.

In moving the door 2 at predetermined acceleration as in the door opening operation from the halfway position (2), when the door 2 reaches the corrected acceleration end point (n) (in the section in which a remaining moving distance in the moving direction of the door 2 is short), the door speed adjusting unit 97 moves the door 2 based on the corrected acceleration end point (n).

On the other hand, in moving the door 2 at predetermined acceleration as in the door opening operation from the halfway position (1), when the door 2 reaches the acceleration end point that is a section between the reference acceleration end point (H) and the dividing position (N) (in the section in which a remaining moving distance in the moving direction of the door 2 is long), the door speed adjusting unit 97 moves the door 2 based on the acceleration end point.

Therefore, in the section in which a remaining distance in the moving direction of the door 2 is short, it is possible to move the door 2 at corrected target maximum speed obtained by reducing the target maximum speed. On the other hand, in the section in which a remaining distance in the moving direction of the door 2 is long, it is possible to move the door 2 at the target maximum speed. As a result, when the door speed adjusting unit 97 starts to move the door 2 with a large amount of door movement from the halfway position, it is possible to move the door 2 without giving a sense of incongruity to the operator at relatively low speed in the section in which the remaining distance is short and move the door 2 with reduced work time at relatively high speed in the section in which the remaining distance is long.

According to the embodiments described above, it is possible to control a speed at which a door is moved depending on a remaining moving distance. As a result, the speed of the door does not change suddenly.

Moreover, according to the embodiments described above, it is possible to control the speed to be rather low when the remaining distance in the moving dire is rather short, and to control the speed to be a target maximum speed when the remaining distance is rather long.

Furthermore, according to the embodiments described above, it is possible to stabilize movement of the door.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A door opening/closing device which moves a door back and forth along a guiding rail to close or open the door, the door opening/closing device comprising:
    a drive mechanism which drives the door by a driving force produced by a motor;
    a sensor configured for detecting at least an initial position of the door; and
    a controller which controls a speed of the door;
    wherein the controller is configured to calculate a moving amount of the door from the initial position to a destination position, to select a speed pattern from a plurality of speed patterns which is preinstalled in the controller based on the calculated moving amount, and to control the speed of the door according to the selected speed pattern, such that the door is accelerated at the same acceleration as a reference door opening/closing speed pattern while the acceleration ends at a position which is closer to a destination position than that of the reference door opening/closing speed pattern when the initial position is a halfway position.

2. The door opening/closing device according to claim 1 further comprising a tilt judging unit which determines an inclination of the door, wherein the controller determines a maximum speed of the door referring to a line of a corrected acceleration end point of the speed pattern, based on the moving amount and the inclination, and controls the speed of the door to gradually accelerate to the determined maximum speed.

3. A method for moving a door back and forth along a guiding rail to close or open the door, the method comprising the steps of:
    driving the door by a driving force produced by a motor;
    detecting at least an initial position of the door; and
    controlling a speed of the door;
    wherein the step of controlling comprises:
        calculating a moving amount of the door from the initial position to a destination position,
        selecting a speed pattern from a plurality of speed patterns which is preinstalled in a controller based on the calculated moving amount, and
        controlling the speed of the door according to the selected speed pattern, such that the door is accelerated at the same acceleration as a reference door opening/closing speed pattern while the acceleration ends at a position which is closer to a destination position than that of the reference door opening/closing speed pattern when the initial position is a halfway position.

4. The method according to claim 3 further comprising a step of determining an inclination of the door, wherein the controlling step comprises determining a maximum speed of the door referring to a line of a corrected acceleration end point of the speed pattern, based on the moving amount and the inclination, and controlling the speed of the door to gradually accelerate to the determined maximum speed.

* * * * *